United States Patent
Bush

(10) Patent No.: US 10,215,316 B2
(45) Date of Patent: Feb. 26, 2019

(54) FITTING SECUREMENT RING FOR THREADED CONNECTOR

(71) Applicant: SDB IP Holdings, LLC, Oviedo, FL (US)

(72) Inventor: Shawn D. Bush, Orlando, FL (US)

(73) Assignee: SDB IP Holdings, LLC, Oviedo, FL (US)

( * ) Notice: Subject to any disclaimer, the term of this patent is extended or adjusted under 35 U.S.C. 154(b) by 748 days.

(21) Appl. No.: 14/677,301

(22) Filed: Apr. 2, 2015

(65) Prior Publication Data

US 2015/0285415 A1    Oct. 8, 2015

Related U.S. Application Data

(60) Provisional application No. 61/975,400, filed on Apr. 4, 2014.

(51) Int. Cl.

| | | |
|---|---|---|
| *F16L 19/12* | (2006.01) | |
| *F16L 15/00* | (2006.01) | |
| *F16L 19/00* | (2006.01) | |
| *F16L 25/10* | (2006.01) | |

(52) U.S. Cl.
CPC .............. *F16L 19/12* (2013.01); *F16L 15/009* (2013.01); *F16L 19/005* (2013.01); *F16L 25/10* (2013.01)

(58) Field of Classification Search
CPC ......... F16B 7/048; F16B 7/182; F16L 15/009; F16L 19/005; F16L 19/12; F16L 25/10; F16L 19/103; Y10T 403/4941; Y10T 403/4949; Y10T 403/4966; F16J 15/0881; F16J 15/0887

USPC ........ 403/279, 280, 282; 285/335, 339, 382, 285/382.7

See application file for complete search history.

(56) References Cited

U.S. PATENT DOCUMENTS

| | | | |
|---|---|---|---|
| 2,021,745 A | | 11/1935 | Pfefferle et al. |
| 2,394,351 A | * | 2/1946 | Wurzburger ............ F16L 19/12 285/341 |
| 2,437,632 A | * | 3/1948 | Wolfram ................. F16L 19/08 220/319 |
| 2,644,700 A | * | 7/1953 | Woodling ............... F16L 19/08 277/622 |
| 3,273,919 A | | 9/1966 | Billeter et al. |
| 3,433,508 A | | 3/1969 | Teeters |
| 3,874,709 A | | 4/1975 | MacDonald |
| 3,879,065 A | | 4/1975 | Kobayashi |
| 3,957,205 A | * | 5/1976 | Costa ..................... B05B 3/026 239/230 |

(Continued)

*Primary Examiner* — Josh Skroupa
(74) *Attorney, Agent, or Firm* — The Webb Law Firm

(57) ABSTRACT

A plumbing connector and method of connection including: a fitting having external threads on at least the first end; a tube having a first end inserted into the first end of the fitting; and an annular gasket, a compression ring, a lock ring, and a nut coaxial with and surrounding the outer diameter of the tube. The nut has internal threads adapted to engage the external threads of the fitting and is adapted to contain the gasket, the compression ring, and the lock ring upon threading of the nut onto the fitting. Upon threading and tightening of the nut onto the fitting, the gasket is compressed, an inner edge of the lock ring bitingly engages the outer diameter of the tube, and the gasket forms a seal with at least the first end of the fitting, the outer diameter of the tube, and an outer edge of the lock ring.

19 Claims, 7 Drawing Sheets

(56) References Cited

U.S. PATENT DOCUMENTS

| | | | |
|---|---|---|---|
| 4,181,329 A | | 1/1980 | Helm |
| 4,586,734 A | | 5/1986 | Grenier |
| 4,777,669 A | | 10/1988 | Rogus |
| 4,792,160 A | | 12/1988 | Hwang |
| 5,121,949 A | | 6/1992 | Reese |
| 5,542,718 A | | 8/1996 | Gronwick et al. |
| 5,921,592 A | | 7/1999 | Donnelly |
| 6,019,131 A | | 2/2000 | Hall |
| 6,361,084 B1 | | 3/2002 | Zarbo |
| 6,378,912 B1 | | 4/2002 | Condon et al. |
| 6,499,771 B1 | | 12/2002 | Snyder, Sr. et al. |
| 7,121,593 B2 | * | 10/2006 | Snyder, Sr. ............ F16L 37/091 285/179 |
| 7,338,030 B2 | | 3/2008 | Brown, III |
| 7,500,699 B2 | * | 3/2009 | Snyder, Sr. ............ F16L 37/091 285/340 |
| 2002/0050718 A1 | | 5/2002 | Pyron |
| 2007/0126231 A1 | | 6/2007 | Thompson |
| 2010/0171302 A1 | | 7/2010 | Yoder |
| 2010/0320755 A1 | * | 12/2010 | Williams .............. F16L 19/061 285/355 |

* cited by examiner

FITTING SECUREMENT RING FOR THREADED CONNECTOR

CROSS-REFERENCE TO RELATED APPLICATION

This application claims priority to U.S. Provisional Application Ser. No. 61/975,400, filed Apr. 4, 2014, which is hereby incorporated by reference in its entirety.

BACKGROUND OF THE INVENTION

Field of the Invention

The present invention relates to a plumbing connector utilizing a fitting securement ring within a threaded connector. More specifically, the invention is directed to a plumbing connector for attaching a vacuum breaker tube to the outlet of a flush valve.

Description of Related Art

In a typical flush valve assembly, a vacuum breaker tube is attached to the outlet of the flush valve. This vacuum breaker tube is attached with additional fittings leading up to a fixture or directly to the spud of a fixture. There have been many problems with blow-outs of the vacuum breaker tube when it is not sufficiently secured to the fixture. Because a flush valve is used to flush water at high velocities, the joint where the tube and the fixture are connected can become compromised causing the tube to blow out of the fitting. These blow-outs can lead to flooding of the surrounding area.

An example of a prior art connector 10 is shown in FIG. 1. The assembly consists of the vacuum breaker tube 12 and a fitting 14, in this case, a brass elbow. The elbow fitting 14 includes a brass body, a brass nut 16, a friction ring 18, and a rubber gasket 20. The brass nut 16 is slipped over the tube 12 followed by the friction ring 18, and then the rubber gasket 20. Once these items are slipped over the tube 12, the tube 12 can then be inserted into the elbow fitting 14. The internal threads of the nut 16 are then threaded onto the external threads of the elbow fitting 14. As the nut 16 is threaded to the elbow, the assembly gets tighter and the gasket 20 begins to compress between the top of the nut 16 and the top of the fitting 14 as shown in FIG. 2. As the gasket 20 is compressed, its inner walls tightly engage the tube's 12 outer wall. At the same time, the bottom of the gasket 20 is being compressed into the end of the elbow fitting 14. In this manner, two seals are created. One seal is created by the compression of the gasket 20 against the tube's 12 outer wall. The second seal is created by the compression of the bottom of the gasket 20 against the elbow fitting's 14 flat top edge. The grip of the rubber gasket 20 on the tube 12 is the only part preventing the tube 12 from blowing out of the elbow fitting 14. This type of securement often proves to be insufficient to overcome the force created by the flushing of the flush valve and the vacuum tube 12 is blown out the fitting 14.

SUMMARY OF THE INVENTION

In one aspect, the present invention is directed to a plumbing connector including: a fitting having a first end and a second end and having external threads on at least the first end; a tube having a first end and a second end, the first end of the tube inserted into the first end of the fitting; and an annular gasket, a compression ring, a lock ring, and a nut coaxial with and surrounding the outer diameter of the tube. The nut has internal threads adapted to engage the external threads of the fitting and is adapted to contain the gasket, the compression ring, and the lock ring upon threading of the nut onto the fitting via the internal threads of the nut and the external threads of the fitting. Upon threading of the nut onto the fitting via the internal threads of the nut and the external threads of the fitting and tightening of the nut, the gasket is compressed, an inner edge of the lock ring bitingly engages the outer diameter of the tube, and the gasket forms a seal with at least the first end of the fitting, the outer diameter of the tube, and an outer edge of the lock ring. As the nut is advanced onto the fitting, the gasket first contacts the compression ring before contacting the lock ring and the inner and outer edges of the compression ring contact the lock ring. Upon tightening of the nut, contact between the compression ring and the lock ring deforms the lock ring pushing the inner edge of the lock ring into a biting engagement with the outer diameter of the tube and the outer edge of the lock ring into a sealing engagement with the gasket.

The compression ring may have an outer diameter smaller than an outer diameter of the lock ring and may comprise a concave side and a convex side where the convex side of the compression ring is adjacent the gasket and the concave side of the compression ring is adjacent the lock ring.

The inner edge of the lock ring may have a series of teeth and the lock ring may comprise a concave side and a convex side where the concave side of the lock ring is adjacent the compression ring and the convex side of the lock ring is adjacent an upper ledge of the nut.

The plumbing connector may also include a friction ring, which may have an outer diameter smaller than an outer diameter of the lock ring, placed between the gasket and the compression ring.

In a further aspect, the present invention is directed to a method of connecting a plumbing fitting to a tube. A fitting having a first end and a second end and having external threads on at least the first end and a tube having a first end and a second end are provided. In the following order: a nut having internal threads adapted to engage the external threads of the fitting, a lock ring having an inner edge and an outer edge, a compression ring having an inner edge and an outer edge, and an annular gasket are slid onto the first end of the tube. The nut is adapted to contain the gasket, the compression ring, and the lock ring upon threading of the nut onto the fitting via the internal threads of the nut and the external threads of the fitting. The first end of the tube is placed into the inner diameter of the first end of the fitting and the nut is threaded onto the fitting and tightened. After tightening of the nut is completed, the gasket is compressed, the inner edge of the lock ring bitingly engages the outer diameter of the tube, and the gasket forms a seal with at least the first end of the fitting, the outer diameter of the tube, and the outer edge of the lock ring.

DETAILED DESCRIPTION

Figure 1:
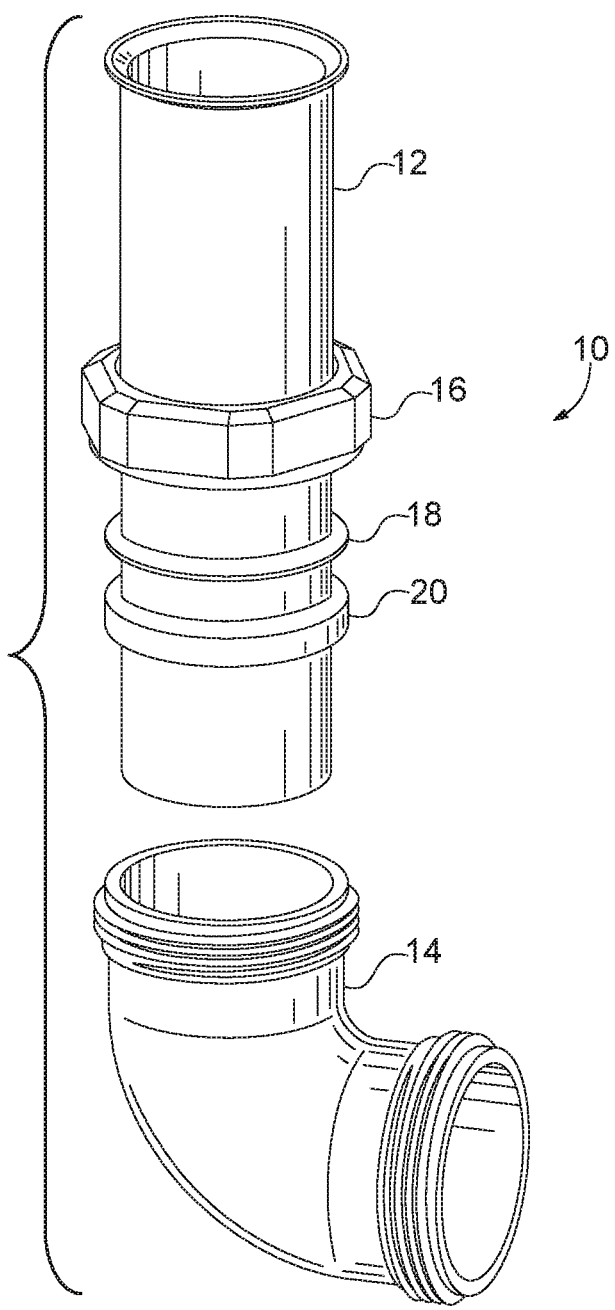
FIG. 1 is a perspective view of a plumbing connector according to the prior art prior to making the connection.
Figure 2:
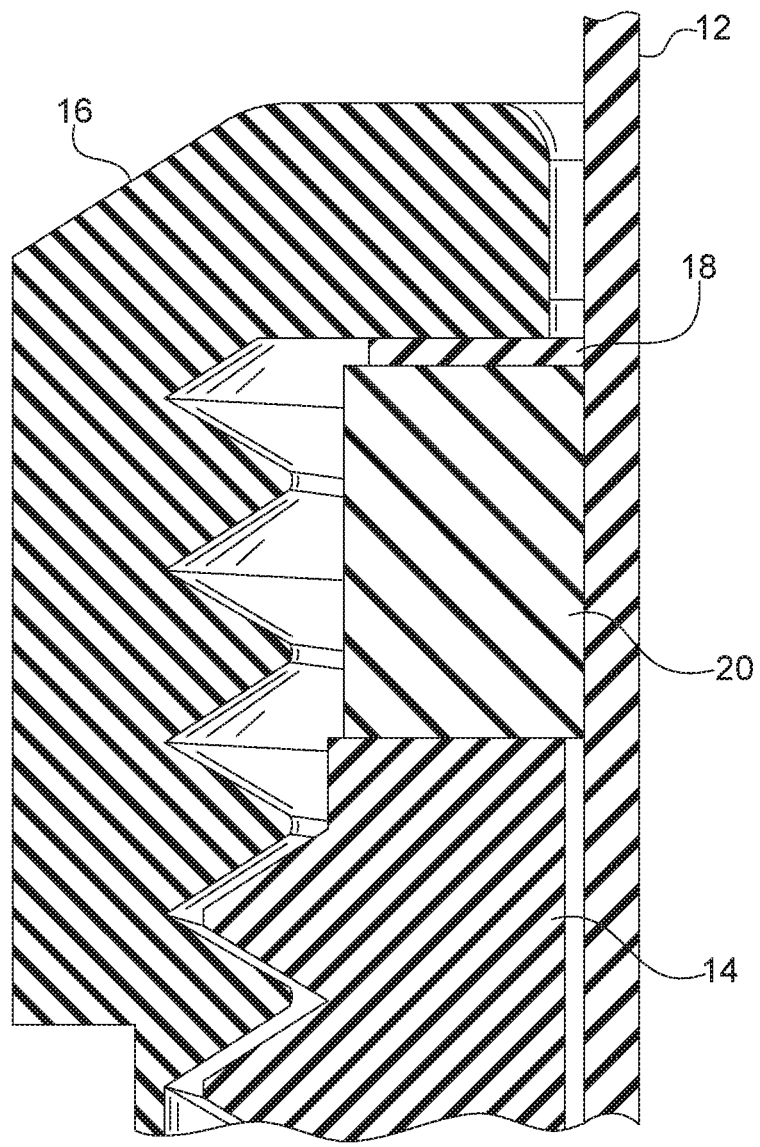
FIG. 2 is a cross-section of the prior art plumbing connector of FIG. 1 after the connection has been made.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices and processes illustrated in the attached drawings, and described in the following specification, are simply exemplary aspects of the invention. Hence, specific dimensions and other physical characteristics related to the aspects disclosed herein are not to be considered as limiting. Further, it is to be understood that the invention may assume various alternative variations except where expressly specified to the contrary.

Figure 3:
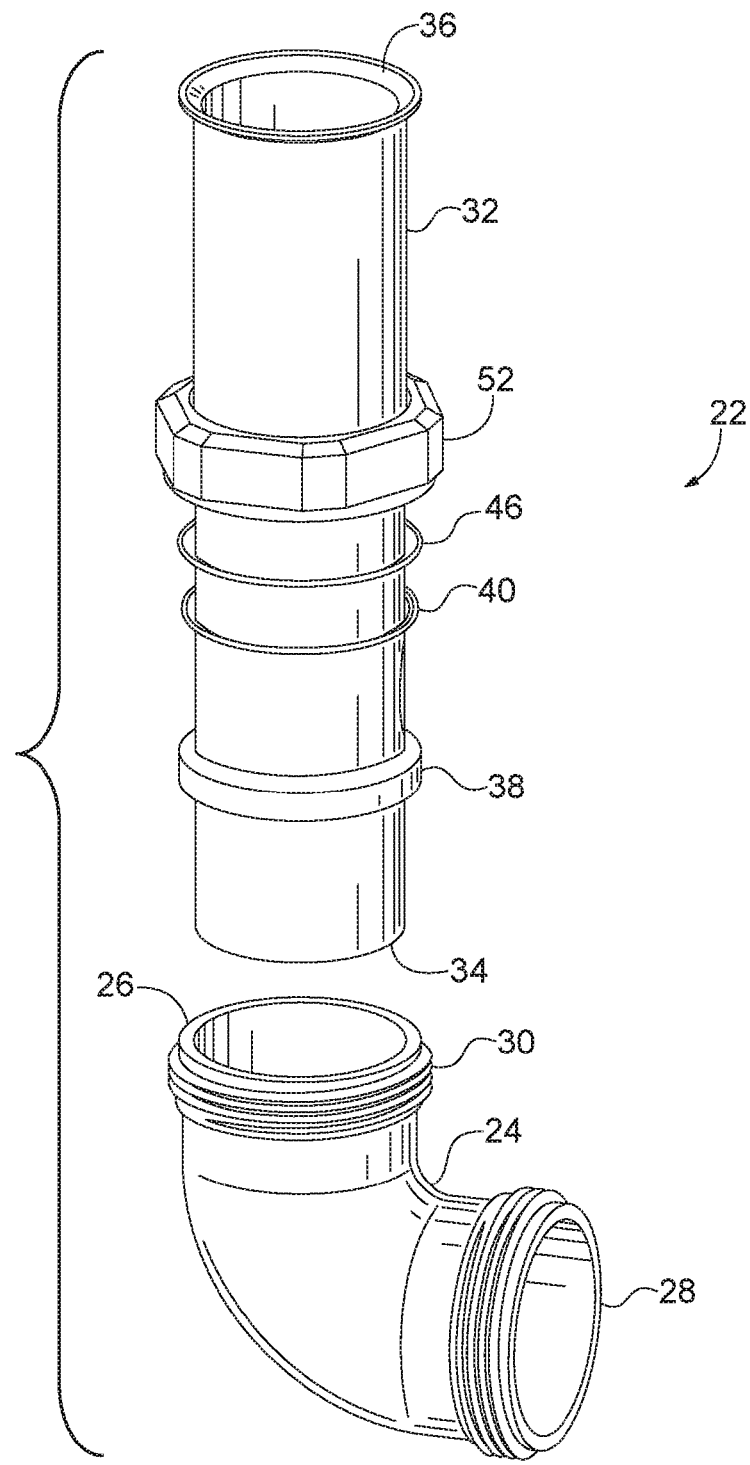
FIG. 3 is a perspective view of a plumbing connector prior to making the connection according to one aspect of the present invention.

As shown in FIG. 3, the plumbing connector 22 comprises a fitting 24 having a first end 26 and a second end 28 and having external threads 30 on at least the first end 26. The fitting 24 may be any suitable fitting for attaching a tube to a flush valve including, but not limited to, an elbow (as shown in FIG. 1), a tee, or a fitting that is integral with a flush valve.

The plumbing connector 22 also includes a tube 32 having a first end 34 and a second end 36. At least the first end 34 of the tube 32 has an outer diameter that is smaller than the inner diameter of the first end 26 of the fitting 24 such that the first end 34 of the tube 32 can be inserted into the first end 26 of the fitting 24. Preferably, the outer diameter of the tube 32 is only slightly smaller than the inner diameter of the fitting 24 to provide a tight fit between the two.

The fitting 24 and the tube 32 may be made of any suitable material including, but not limited to, brass, plastic, chrome, and steel.

The plumbing connector 22 includes an annular gasket 38. The gasket 38 has an inner diameter equal to or slightly larger than the outer diameter of the tube 32 and an outer diameter equal to or slightly smaller than the inner diameter of the first end 26 of the fitting 24. The gasket 38 may be made from any suitable compressible material including, but not limited to, rubber. The gasket 38 is used to help hold the tube 32 within the fitting 24 via compressive and frictional forces between the gasket 38 and the tube 32. The gasket 38 is also part of the sealing system of the connector 22.

The connector 22 includes a compression ring 40 having an outer edge 42 and an inner edge 44, and a lock ring 46 having an outer edge 48 and an inner edge 50. The compression ring 40 and the lock ring 46 are made of a deformable material, preferably stainless steel. The material of the lock ring 46 may have a hardness greater than the hardness of the tube 32.

The connector 22 includes a nut 52 having internal threads 54 adapted to engage the external threads 30 of the fitting 24.

Figure 4:
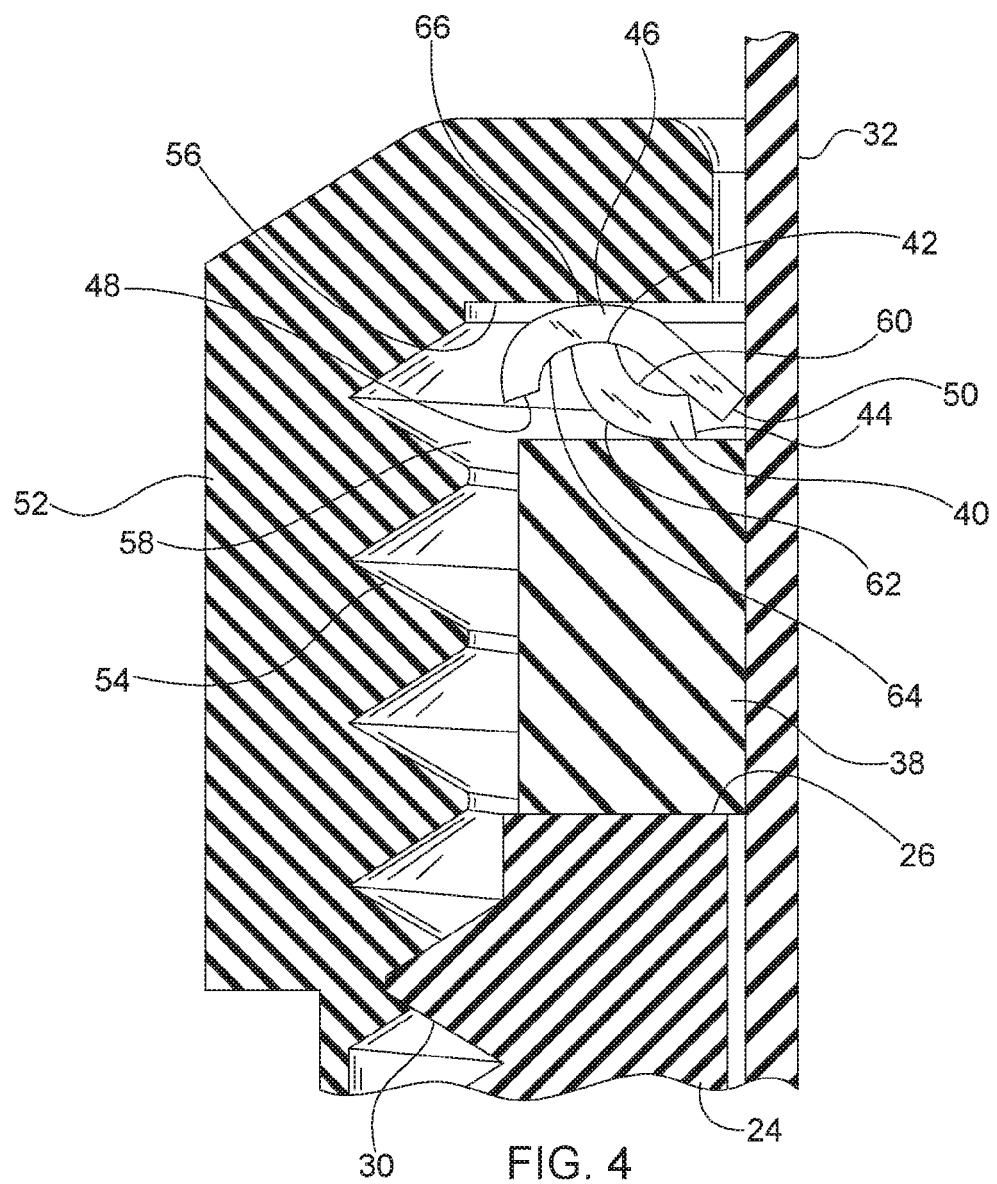
FIG. 4 is a cross-section of the plumbing connector of FIG. 3 after threading the nut onto the fitting but before tightening the nut.

FIG. 4 shows the connector in the partially assembled condition where the internal threads 54 of the nut 52 have been threaded onto the external threads 30 of the fitting 24, but the threaded arrangement has not yet been tightened. As shown in FIG. 4, the nut 52 has an upper ledge 56 and a cavity 58 adapted to contain the gasket 38, the compression ring 40, and the lock ring 46 upon threading of the nut 52 onto the fitting 24 via the internal threads 54 of the nut 52 and the external threads 30 of the fitting 24.

Figure 5:
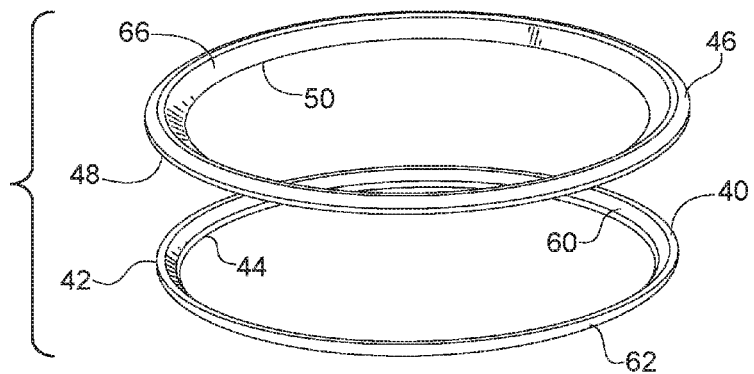
FIG. 5 is a perspective view of a compression ring and a lock ring according to one aspect of the present invention.

As can be seen from FIGS. 4 and 5, which show the compression ring 40 and the lock ring 46 in more detail, the compression ring 40 is generally cup-shaped having a curved cross-section and comprising a concave side 60 and a convex side 62. The curve of the compression ring 40 is such that the inner edge 44 is on a different horizontal plane than the outer edge 42 as shown in FIG. 5.

The lock ring 46 is also generally cup-shaped having a curved cross-section and comprising a concave side 64 and a convex side 66.

The compression ring 40 has an outer diameter that is smaller than the outer diameter of the lock ring 46.

To assemble the connector 22, the nut 52 is first slid over the tube 32 followed by the lock ring 46. The lock ring 46 is placed over the tube 32 such that the convex side 66 of the lock ring 46 faces the upper ledge 56 of the nut 52 and the concave side 64 of the lock ring 46 faces the first end 34 of the tube 32. Due to the curved cross-section of the lock ring 46, the inner edge 50 of the lock ring 46 is pointing away from the ledge 56 of the nut 52. The compression ring 40 is then placed over the tube 32 such that the concave side 60 of the compression ring 40 faces the lock ring 46 and the convex side 62 of the compression ring 40 faces the first end 34 of the tube 32. The gasket 38 is then placed over the tube 32 and the first end 34 of the tube 32 is inserted into the fitting 24.

The nut 52 is then advanced onto the fitting 24 via the internal threads 54 of the nut 52 and the external threads 30 of the fitting 24. As can be seen in FIG. 4, when the nut 52 has been screwed onto the fitting 24 but has not yet been tightened, the compression ring 40 extends into the concave side 64 of the lock ring 46, and the inner edge 44 and the outer edge 42 of the compression ring 40 contact the concave side 64 of the lock ring 46. The convex side 66 of the lock ring 46 contacts the ledge 56 of the nut 52 and the outer edge 48 of the lock ring 46 is not in contact with either the compression ring 40 or the gasket 38. One end of the gasket 38 contacts the first end 26 of the fitting 24 and the other end of the gasket 38 contacts the convex side 62 of the compression ring 40.

Figure 6:
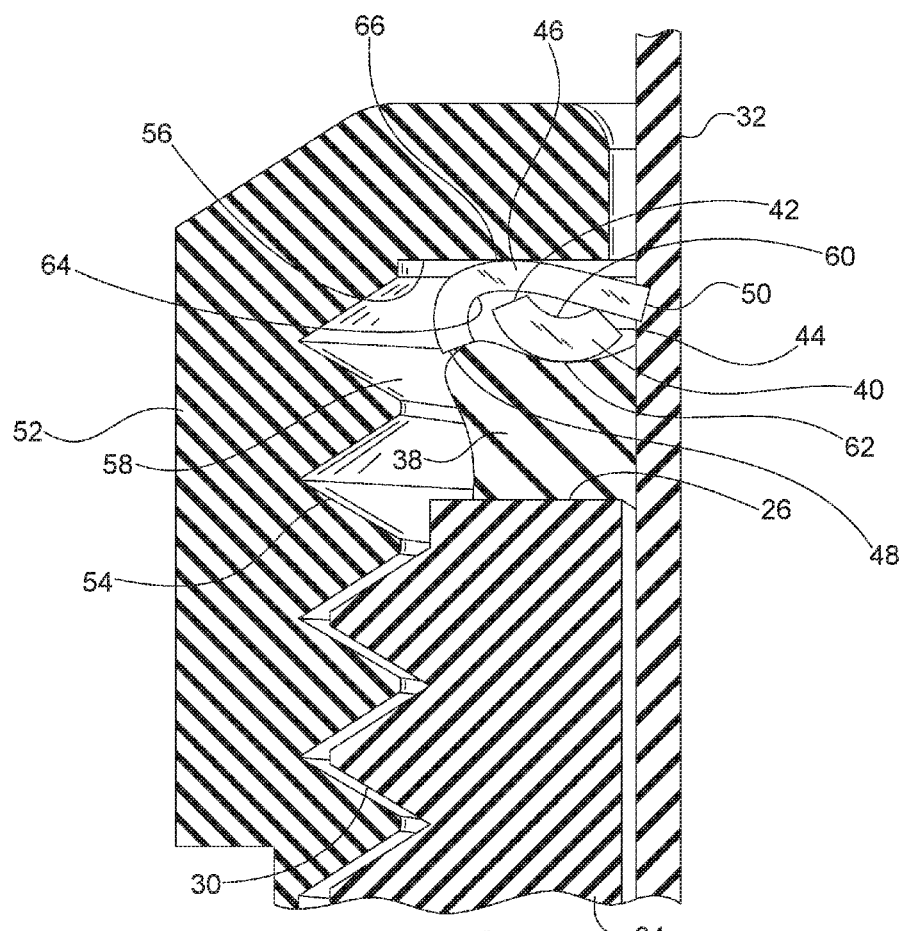
FIG. 6 is a cross-section of the plumbing connector of FIG. 3 after tightening the nut.

When the nut 52 is then tightened onto the fitting 24 via the internal threads 54 of the nut 52 and the external threads 30 of the fitting 24 as shown in FIG. 6, several things occur. The gasket 38 compresses. As the assembly gets tighter, the compression ring 40 and the lock ring 46 begin to deform from the compressive forces placed on them by the ledge 56 of the nut 52 and the gasket 38. The edges 42, 44 of the compression ring 40 force the inner edge 50 of the lock ring 46 upward toward the ledge 56 of the nut 52 and force the outer edge 48 of the lock ring 46 into a biting engagement with the outer wall of the tube 32. The outer edge 48 of the lock ring 46 after deformation is angled at a precise angle to achieve optimal holding strength. As the inner edge 50 of the lock ring 46 deforms and locks into the outer wall of the tube 32, the outer edge 48 of the lock ring 46 is deformed in a downward and inward direction pushing on the gasket 38. This ensures the gasket 38 does not leak due to the added deformation of its shape and adds to the stability of the water tight seal.

The compression ring 40 also deforms such that its inner edge 44 and outer edge 42 become closer to being on the same horizontal plane. Both the inner edge 44 and outer edge 42 of the compression ring 40 contact the concave side 64 of the lock ring 46 and the convex side 62 of the compression ring 40 contacts the gasket 38 forming a seal between the compression ring 40 and the gasket 38.

Upon the flushing action of the valve, the water pressure will try to pull the tube 32 out of the fitting 24 but, with the lock ring 46/compression ring 40 assembly in place as the tube 32 tries to pull away from the fitting 24, the inner edge 50 of the lock ring 46 will only dig further in the tube 32.

Figure 7:
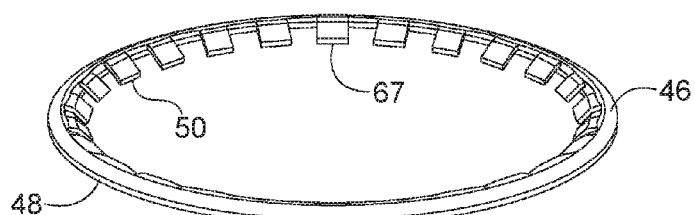
FIG. 7 is a perspective view of a lock ring according to a second aspect of the present invention.

In another aspect of the invention, the inner edge 50 of the lock ring 46 may comprise a series of teeth 67 as shown in FIG. 7.

Figure 8:
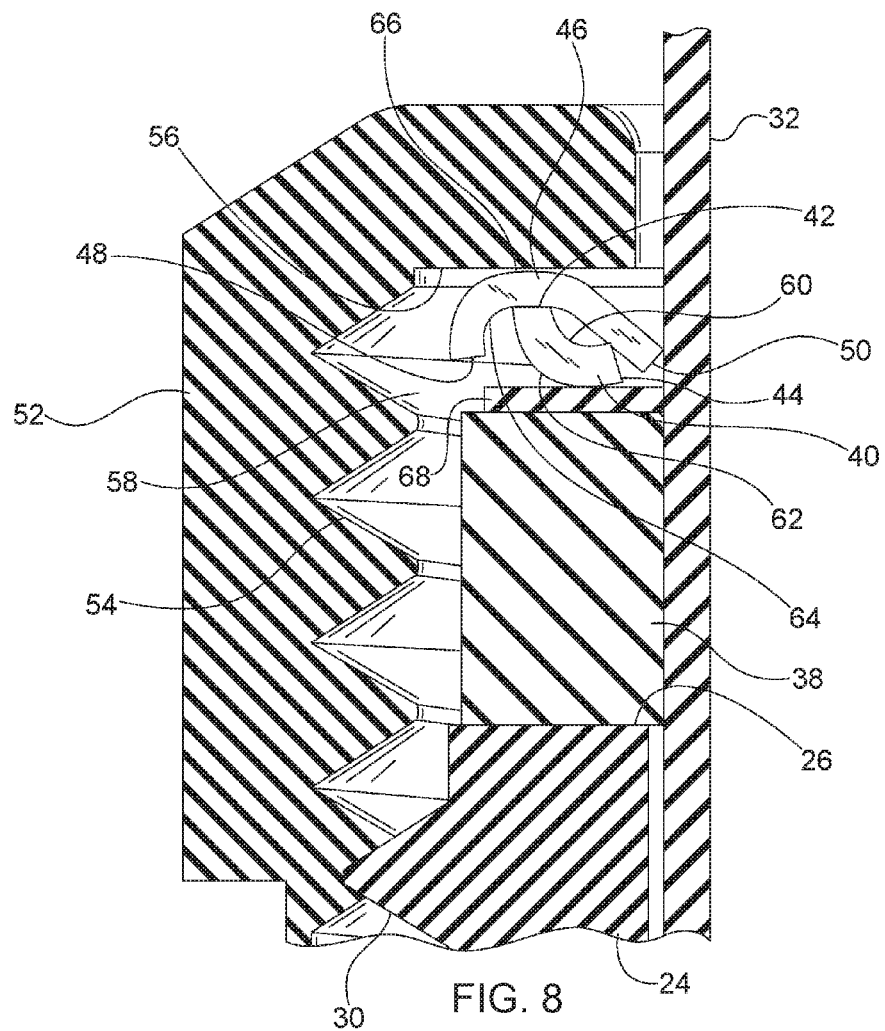
FIG. 8 is a cross-section of a plumbing connector after threading the nut onto the fitting but before tightening the nut according to a second aspect of the present invention.
Figure 9:
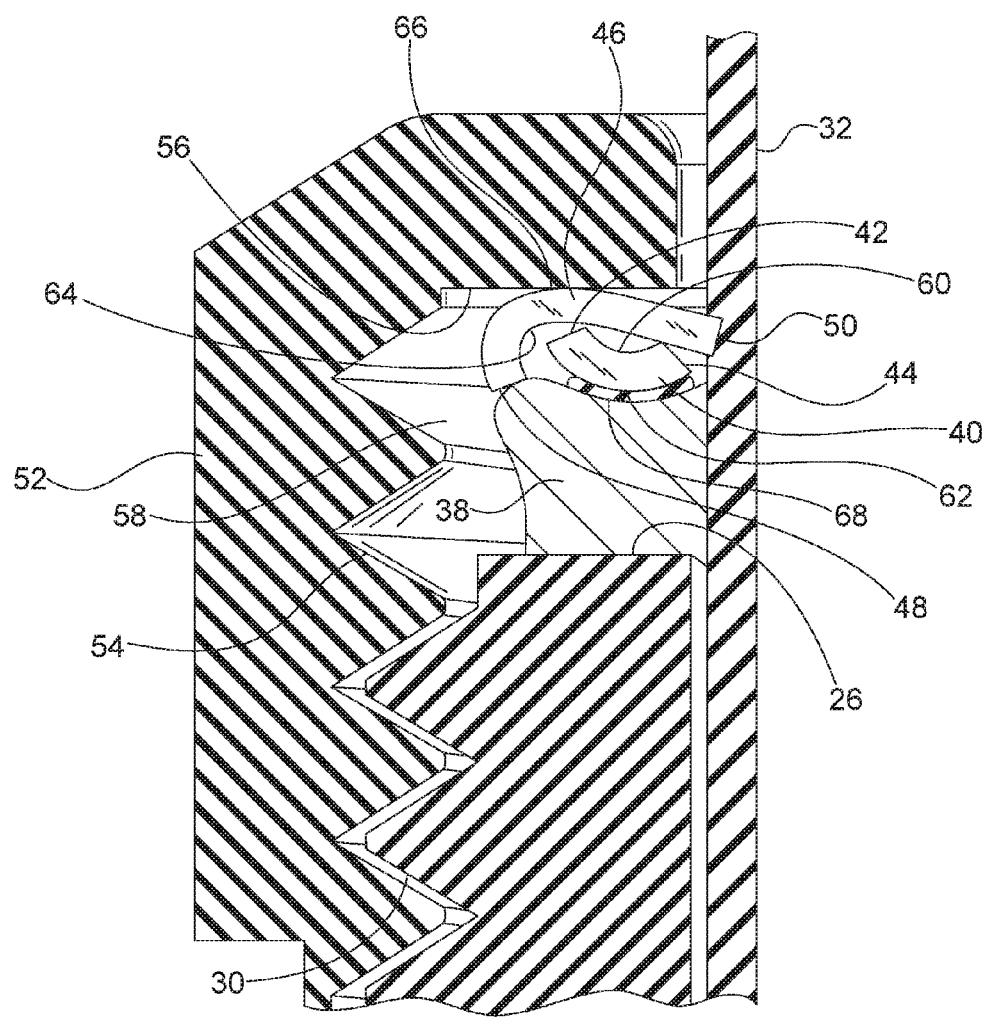
FIG. 9 is a cross-section of the plumbing connector of FIG. 8 after tightening the nut.

As shown in FIGS. 8 and 9, the connector 22 may further comprise a friction ring 68 placed between the compression ring 40 and the gasket 38. The friction ring's 68 outer diameter is sized so that it does not interfere with the seal between the outer edge 48 of the lock ring 46 and the gasket 38 when the connector 22 is tightened. In one aspect of the invention shown in FIGS. 8 and 9, the outer diameter of the friction ring 68 is smaller than the outer diameter of the lock ring 46. The friction ring 68 may provide additional support for deformation of the compression ring 40 and the lock ring 46 on tightening of the connector 22 and may be used to assure that the lock ring 46 does not cut into the soft gasket 38. The friction ring 68 may be made from materials including, but not limited to, brass and rubber.

A connector according to the prior art was made using a chrome vacuum tube, a brass elbow fitting, a rubber gasket and friction ring, and a brass nut. The pullout force necessary to remove the tube was determined using a 50 lb. force gauge after tightening the connector using a slip nut wrench and applying various levels of torque. At each torque level, three tests were made. A compression ring and lock ring having teeth according to the invention were made of 3D printed photopolymer material and included in the connector and the testing was repeated. The results are shown in Table 1 below. The force necessary to remove the tube from the fitting was increased by up to 20% by the addition of the compression ring and lock ring.

TABLE 1

| | Pullout Force (lbs.) | |
|---|---|---|
| | Without compression ring and lock ring | With compression ring and lock ring |
| 90 in.-lbs. torque | | |
| Trial #1 | 33 | 44 |
| Trial #2 | 35 | 39 |
| Trial #3 | 34 | 40 |
| Average | 34 | 41 |
| 135 in.-lbs. torque | | |
| Trial #1 | 40 | 45 |
| Trial #2 | 42 | 50 |
| Trial #3 | 41 | >50 |
| Average | 41 | 49 |
| 180 in.-lbs. torque | | |
| Trial #1 | 47 | >50 |
| Trial #2 | 48 | >50 |

TABLE 1-continued

| | Pullout Force (lbs.) | |
|---|---|---|
| | Without compression ring and lock ring | With compression ring and lock ring |
| Trial #3 | 46 | >50 |
| Average | 47 | >50 |

Although the invention has been described in detail for the purpose of illustration based on what is currently considered to be the most practical and preferred aspects of the present invention, it is to be understood that such detail is solely for that purpose and that the invention is not limited to the disclosed aspects, but, on the contrary, is intended to cover modifications and equivalent arrangements that are within the spirit and scope of this specification. For example, it is to be understood that the present invention contemplates that, to the extent possible, one or more features of any aspect of the invention can be combined with one or more features of any other aspect of the invention.

The invention claimed is:

1. A plumbing connector comprising:
a fitting having a first end and a second end and having external threads on at least the first end;
a tube having a first end and a second end, the first end of the tube inserted into the first end of the fitting;
an annular gasket coaxial with and surrounding an outer diameter of the tube and adjacent the first end of the fitting;
a compression ring coaxial with and surrounding the outer diameter of the tube and adjacent the gasket, the compression ring having an inner edge and an outer edge; and
a lock ring coaxial with and surrounding the outer diameter of the tube and adjacent the compression ring, the lock ring having an inner edge and an outer edge;
a nut coaxial with and surrounding an outer diameter of the tube and having internal threads adapted to engage the external threads of the fitting, the nut adapted to contain the gasket, compression ring, and lock ring upon threading of the nut onto the fitting via the internal threads of the nut and the external threads of the fitting,
wherein, upon threading of the nut onto the fitting via the internal threads of the nut and the external threads of the fitting and tightening of the nut, the gasket is compressed, the inner edge of the lock ring bitingly engages the outer diameter of the tube, the gasket forms a seal with at least the first end of the fitting, the outer diameter of the tube, and the outer edge of the lock ring, and contact between the compression ring and the lock ring deforms the lock ring pushing the inner edge of the lock ring into a biting engagement with the outer diameter of the tube and the outer edge of the lock ring into a sealing engagement with the gasket, and the compression ring is spaced apart from the tube.

2. The plumbing connector of claim 1, wherein, as the nut is advanced onto the fitting via the internal threads of the nut and the external threads of the fitting, the gasket contacts the compression ring before contacting the lock ring.

3. The plumbing connector of claim 1, wherein, as the nut is advanced onto the fitting via the internal threads of the nut and the external threads of the fitting, a portion of the compression ring contacts the gasket and the inner edge and the outer edge of the compression ring contacts the lock ring.

4. The plumbing connector of claim 1, wherein the compression ring has an outer diameter smaller than an outer diameter of the lock ring.

5. The plumbing connector of claim 1, wherein the inner edge of the lock ring comprises a series of teeth.

6. The plumbing connector of claim 1, wherein the compression ring comprises a concave side and a convex side and the convex side of the compression ring is adjacent the gasket and the concave side of the compression ring is adjacent the lock ring.

7. The plumbing connector of claim 1, wherein the lock ring comprises a concave side and a convex side and the concave side of the lock ring is adjacent the compression ring and the convex side of the lock ring is adjacent an upper ledge of the nut.

8. The plumbing connector of claim 1, wherein the gasket, the compression ring, the lock ring, and the nut are located on the tube in the following order starting from the first end of the tube: the gasket, the compression ring, the lock ring, and the nut.

9. The plumbing connector of claim 8, wherein a friction ring is placed between the gasket and the compression ring.

10. The plumbing connector of claim 9, wherein the friction ring has an outer diameter smaller than an outer diameter of the lock ring.

11. A method of connecting a plumbing fitting to a tube:
a) providing a fitting having a first end and a second end and having external threads on at least the first end and a tube having a first end and a second end;
b) sliding on a first end of the tube in the following order:
i) a nut having internal threads adapted to engage the external threads of the fitting;
ii) a lock ring having an inner edge and an outer edge;
iii) a compression ring having an inner edge and an outer edge; and
iv) an annular gasket,
wherein the nut is adapted to contain the gasket, the compression ring, and the lock ring upon threading of the nut onto the fitting via the internal threads of the nut and the external threads of the fitting,
c) placing the first end of the tube into an inner diameter of the first end of the fitting;
d) threading the nut onto the fitting via the internal threads of the nut and the external threads of the fitting; and
e) tightening the nut,
wherein, after tightening of the nut is completed, the gasket is compressed, the inner edge of the lock ring bitingly engages an outer diameter of the tube, and the gasket forms a seal with at least the first end of the fitting, the outer diameter of the tube, and the outer edge of the lock ring, and
wherein, during tightening of the nut, contact between the compression ring and the lock ring deforms the lock ring pushing the inner edge of the lock ring into a biting engagement with an outer diameter of the tube and the outer edge of the lock ring into a sealing engagement with the gasket, while maintaining the compression ring spaced apart from the tube.

12. The method of claim 11, wherein, during threading of the nut, the gasket contacts the compression ring before contacting the lock ring.

13. The method of claim 11, wherein, during threading of the nut, a portion of the compression ring contacts the gasket and the inner edge and the outer edge of the compression ring contact the lock ring.

14. The method of claim 11, wherein the compression ring has an outer diameter smaller than an outer diameter of the lock ring.

15. The method of claim 11, wherein the inner edge of the lock ring comprises a series of teeth.

16. The method of claim 11, wherein the compression ring comprises a concave side and a convex side and the convex side of the compression ring is adjacent the gasket and the concave side of the compression ring is adjacent the lock ring.

17. The method of claim 11, wherein the lock ring comprises a concave side and a convex side and the concave side of the lock ring is adjacent the compression ring and the convex side of the lock ring is adjacent an upper ledge of the nut.

18. The method of claim 11, further comprising placing a friction ring between the gasket and the compression ring.

19. A plumbing connector comprising:
a fitting having a first end and a second end and having external threads on at least the first end;
a tube having a first end and a second end, the first end of the tube inserted into the first end of the fitting;
an annular gasket coaxial with and surrounding an outer diameter of the tube and adjacent the first end of the fitting;
a compression ring coaxial with and surrounding the outer diameter of the tube and adjacent the gasket, the compression ring having an inner edge and an outer edge; and
a lock ring coaxial with and surrounding the outer diameter of the tube and adjacent the compression ring, the lock ring having an inner edge and an outer edge;
a nut coaxial with and surrounding an outer diameter of the tube and having internal threads adapted to engage the external threads of the fitting, the nut adapted to contain the gasket, compression ring, and lock ring upon threading of the nut onto the fitting via the internal threads of the nut and the external threads of the fitting,
wherein, upon threading of the nut onto the fitting via the internal threads of the nut and the external threads of the fitting and tightening of the nut, the gasket is compressed, the inner edge of the lock ring bitingly engages the outer diameter of the tube, and the gasket forms a seal with at least the first end of the fitting, the outer diameter of the tube, and the outer edge of the lock ring,
wherein the gasket, the compression ring, the lock ring, and the nut are located on the tube in the following order starting from the first end of the tube: the gasket, the compression ring, the lock ring, and the nut,
wherein a friction ring is placed between the gasket and the compression ring, and
wherein the friction ring has an outer diameter smaller than an outer diameter of the lock ring.

* * * * *